US008789020B2

(12) United States Patent
Chung et al.

(10) Patent No.: US 8,789,020 B2
(45) Date of Patent: Jul. 22, 2014

(54) INTERACTIVE DEBUGGING ENVIRONMENTS AND METHODS OF PROVIDING THE SAME

(75) Inventors: Albert Alexander Chung, Cary, NC (US); Venkata Vishwanath Gadepalli, Apex, NC (US); Richard Elwood Osowski, Jr., Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 13/223,648

(22) Filed: Sep. 1, 2011

(65) Prior Publication Data

US 2013/0061210 A1    Mar. 7, 2013

(51) Int. Cl.
*G06F 9/44*    (2006.01)

(52) U.S. Cl.
USPC ............ 717/125; 717/124; 717/126; 717/131

(58) Field of Classification Search
USPC ................. 717/105–109, 124–135, 160, 174; 709/206, 220–231; 714/2–20, 4.3, 4.5, 714/41–48
See application file for complete search history.

(56) References Cited

U.S. PATENT DOCUMENTS

| | | | | |
|---|---|---|---|---|
| 6,058,493 | A * | 5/2000 | Talley | 714/38.1 |
| 6,067,639 | A * | 5/2000 | Rodrigues et al. | 714/38.11 |
| 6,408,403 | B1 * | 6/2002 | Rodrigues et al. | 714/38.11 |
| 6,539,501 | B1 | 3/2003 | Edwards | |
| 7,441,234 | B2 * | 10/2008 | Cwalina et al. | 717/128 |
| 7,606,893 | B2 | 10/2009 | Petrov et al. | |
| 2002/0100023 | A1 | 7/2002 | Ueki | |
| 2004/0025077 | A1 * | 2/2004 | Salem | 714/2 |
| 2007/0239799 | A1 | 10/2007 | Modi | |
| 2009/0144699 | A1 | 6/2009 | Fendt | |
| 2009/0178029 | A1 * | 7/2009 | Akeel et al. | 717/125 |
| 2010/0030785 | A1 | 2/2010 | Wilson | |
| 2011/0078666 | A1 * | 3/2011 | Altekar | 717/131 |
| 2012/0210299 | A1 * | 8/2012 | Pasternak | 717/115 |

OTHER PUBLICATIONS

Hangal et al., Tracking Down Software Bugs Using Automatic Anomaly Detection, ACM, 2002, pp. 291-301.*
Logging Facility for Python; "15.7. logging—Logging Facility for Python", Python v2.7.1 documentation; http://docs.python.org/library/logging.html; pp. 1-61.
Apache HTTP Server; "Apache HTTP Server Version 2.2: Log Files"; http://httpd.apache.org/docs/current/logs.html; pp. 1-7.
JDeveloper Frequently Asked Questions; "How to Perform Log Analysis using the Diagnostic Log Analyzer in JDeveloper 11g"; http://jdeveloperfaq.blogspot.com/2010/01/faq-8-how-to-perform-log-analysis-using.html; 11 pages.

* cited by examiner

*Primary Examiner* — Wei Zhen
*Assistant Examiner* — Satish Rampuria
(74) *Attorney, Agent, or Firm* — Schmeiser, Olson & Watts LLP (57) ABSTRACT

Described are systems and methods for generating interactive in memory objects from stored program failure data. An anomalous condition related to a program failure is detected. Data is captured regarding the anomalous condition. The captured data is stored. The stored data is converted into at least one in-memory object. A runtime environment is reproduced about a region of code related to the program failure from the at least one in-memory object.

8 Claims, 5 Drawing Sheets

INTERACTIVE DEBUGGING ENVIRONMENTS AND METHODS OF PROVIDING THE SAME

FIELD OF THE INVENTION

The present invention relates generally to software debugging environments, and more specifically to systems and methods for generating executable, interactive objects from data captured in response to a program code failure.

BACKGROUND

Modern software programs can be complex and consist of many components that interact with each other. When problems arise such as a program failure during execution, a software developer or a quality assurance engineer, support technician, or other troubleshooter will attempt to isolate the problem in an effort to correct the error or otherwise debug the suspect component, for example, by providing a code fix or other resolution. Typically, a software program at fault is running on a remote location not accessible by the software vendor. In order to determine the cause of the software failure, the developer or support engineer will attempt to reproduce the environment in which the problem occurred. The advantage of reproducing the problem in house is that the developer or support engineer can attach a debugging tool, referred to as a debugger, to observe the state of the objects around the failure point. This can be useful for providing information as to what the problem is and how to fix it. However, reproducing a problem at a software application or software solution level may be difficult due to complex component dependencies, software configuration, data used, and custom end user code involved. Thus, instead of trying to reproduce the entire end user's software setup, for example, in house by the software vendor's support team, a portion of the end user's software runtime environment around the failure point can be reproduced. With this localized environment around the suspect object class or component, a debugger can be attached to this environment to see the contextual state of the objects about which the suspect component is interacting in order to obviate the need for debugging in a larger product environment.

BRIEF SUMMARY

In one aspect, a computer-implemented method for generating interactive in memory objects from stored program failure data is provided. An anomalous condition related to a program failure is detected. Data is captured regarding the anomalous condition. The captured data is stored. The stored data is converted into at least one in-memory object. A runtime environment is reproduced about a region of code related to the program failure from the at least one in-memory object.

In another aspect, a computer-implemented method for debugging a software program is provided. A snapshot of an active class is generated in response to an abnormal condition generated from a software component failure. Object data captured from the snapshot is auto-serialized. The serialized object data is converted into at least one in-memory object. A runtime environment is reproduced about a region of program code related to the software component failure from the at least one in-memory object.

In another aspect, an in-memory interactive object generator comprises an object extraction module and an object inflation module. The object extraction module extracts contextual object data related to a program failure from a passive log file. The object inflation module that instantiates corresponding objects in memory from the extracted contextual object data.

In another aspect, a computer program product generates interactive in memory objects from stored program failure data. The computer program product comprises a computer readable storage medium having computer readable program code embodied therewith. The computer readable program code comprises computer readable program code configured to detect an anomalous condition related to a program failure. The computer readable program code further comprises computer readable program code configured to capture data regarding the anomalous condition. The computer readable program code further comprises computer readable program code configured to store the captured data. The computer readable program code further comprises computer readable program code configured to convert the stored data into at least one in-memory object. The computer readable program code further comprises computer readable program code configured to reproduce a runtime environment about a region of code related to the program failure from the at least one in-memory object.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

The contextual information corresponding to a localized environment can be captured in a log file, trace, memory dump, and the like, and can be used by software developers to determine a source of the software problem. However, the process of reading flat-file, text-based logs, traces, and the like can be tedious and time-consuming, as well as prone to human error. For example, a support engineer can step through the code to inspect the variables along the way containing the expected values, which is a manual process that requires tedious visual inspections.

Custom probe programs can be provided to ameliorate the manual requirements of a support engineer. Here, the probe program can be run when certain breakpoints are encountered. However, when interacting with program execution errors, the user must be attached to the live running process at the time the error occurs. This requires the support engineer to complete the cumbersome task of recreating the offending environment, for attaching the probe programs. As most errors are not expected and offending environments are not readily available, the ability to avoid recreating such environments and to recreate the offending code artifacts is important.

In brief overview, systems and methods are provided for transforming relevant log or trace data into an active in-memory representation of the objects which reflect a localized representation of the original environment in which a software component failed. During operation, contextual object information related to a program failure is automatically extracted from a log, trace, dump, and the like that is generated during execution of the program. The systems and methods can instantiate corresponding objects in memory from the contextual object information by deserializing, or inflating, the captured object data. Accordingly, the logged data can be converted into interactive in-memory objects, which when deserialized can be used locally by a sandbox or other debugging tool for reproducing the failure, identifying the source of the error, and the like. In this manner, a standalone runtime environment can be reproduced around just the failure section of the program code so that a debugging tool can be used to analyze the object states in that area captured at the time of failure.

Accordingly, the systems and methods automatically create an in-memory environment which, to an extent, represents the relevant section of the user's environment. A developer can therefore avoid the laborious effort of analyzing log or trace files, or the need of a debugger being attached to the full live running production process at the time the error occurs, for example, debugging code that is executed when breakpoints are encountered. Instead, the systems and methods of the present inventive concepts permit direct interaction with the deserialized in-memory objects, so that problem determination can occur when isolated to a simple unit-test sandbox or other debugging tool. This manner of creating an executable and interactive environment with respect to the objects in the files, as opposed to remaining a passive text-based repository as with flat log files, permits a developer to utilize the logged information to recreate the original conditions under which the exception or error was generated at will, without additional software or environmental concerns.

Figure 1:
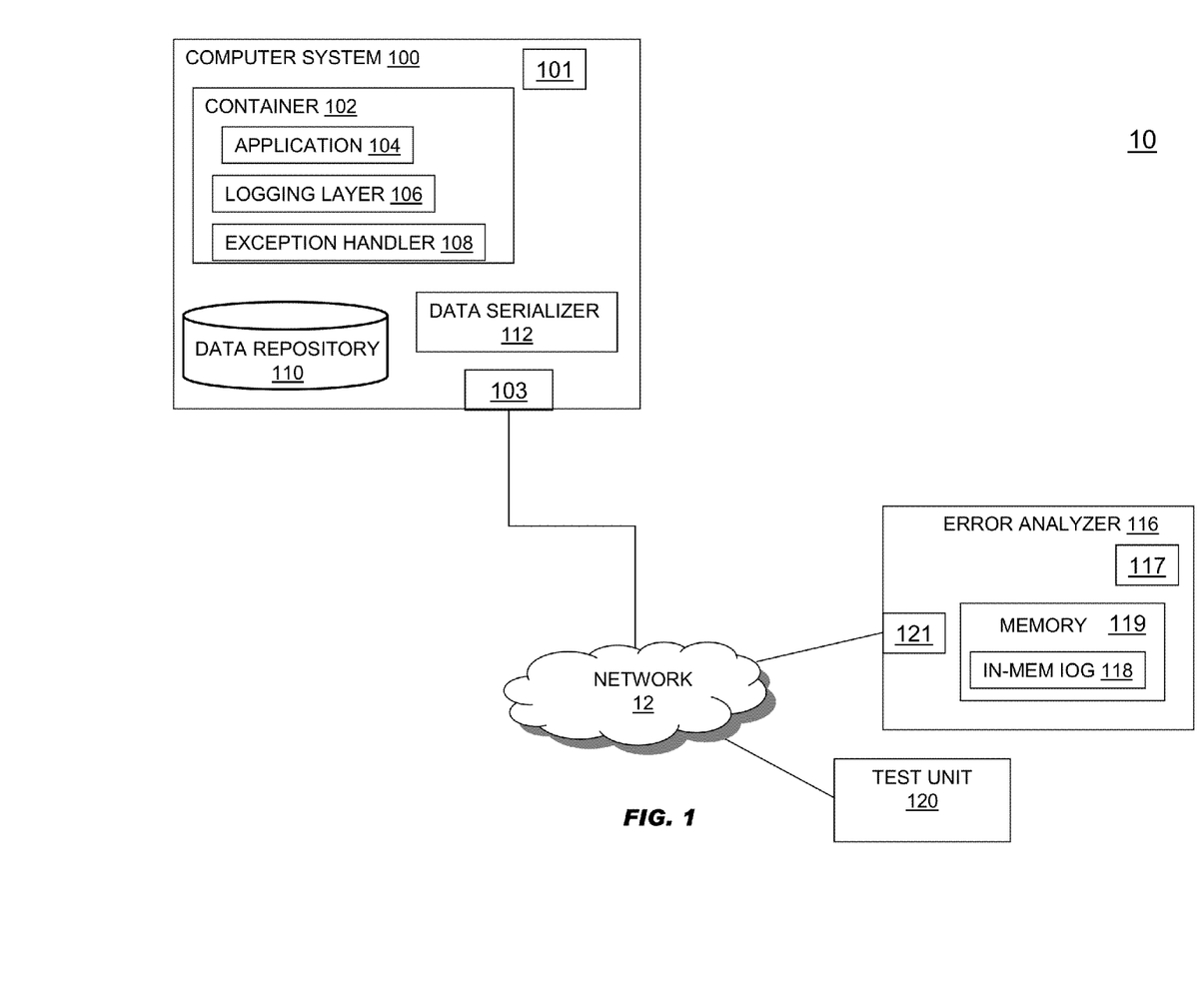
FIG. 1 is a block diagram of an interactive debugging environment in which embodiments of the present inventive concepts can be practiced.

FIG. 1 is a block diagram of an interactive debugging environment 10 in which embodiments of the present inventive concepts can be practiced. The interactive debugging environment 10 includes a computer system 100 having program code therein that is experiencing a failure, for example, program code related to an application 104. The interactive debugging environment 10 also includes an error analyzer 116 and an optional test unit, for example, a debugging tool.

The computer system 100 includes a processor 101, a memory having a container 102, a data serializer 112, and/or a data repository 110, and a network interface 103, which can communicate with each other via a bus and/or data connector, for example, a Peripheral Component Interconnect (PCI) bus. The computer system 100 can include an application server or related server used in a development environment.

The network interface 103 can include one or more adaptors for communicating with the error analyzer 116 and/or other electronic devices via a network 12 such as a WAN, LAN, Internet, public network, private network, and the like, or via a direct connection.

The memory can include volatile memory, for example, RAM and the like, and/or non-volatile memory, for example, ROM, flash memory, and the like. The memory can include removable and/or non-removable storage media implemented in accordance with methods and technologies known to those of ordinary skill in the art for storing data. Stored in the memory can include program code, such as program code of an operating system executed by the processor 101, and/or program code corresponding to contents of the container 102, for example, an application 104.

The container 102 includes at least one application 104, a logging layer 106, and an exception handler 108. The container 102 can include a web container, an Enterprise Java-Beans (EJB) container, a Service Component Architecture (SCA) container, or other runtime platform. for elements of the application 104 stored in the memory. The application 104 can include an object oriented application, for example, a Java® application, or other application including program code that can reside in the memory of the computing system 100.

The logging layer 106 can capture information related to an exception during program execution, for example, program code of a component of the application 104 experiencing a failure, and store the captured information in the data repository 110. The data repository 110 can be part of the computer system 100 as shown in FIG. 1, or can be located separately from the computer system 100 and in communication with the computer system 100 via the network 112, a direct connection, or other connection. The data repository 110 can receive and store logs, traces, dumps, and the like, which can be in the form of character or text files for processing by the error analyzer 116. The logging layer 106 can include different logging levels, for example, configured for performing logging at one or more different levels of granularity with respect to the captured information, thereby allowing for a variable amount of reconstruction depending on the debugging requirements. Multiple logging levels can allow for referenced in-memory classes to be serialized as well as for white-box debugging. Alternately, they can be omitted for black-box debugging for performance-related reasons.

The exception handler 108 can catch and handle exceptions by executing a snapshot of active classes around where a program component failure occurs. The snapshot can be correlated with exception data stored as log files and the like in the data repository 110. The snapshot can include the current values of member fields of one or more classes, current values of input parameters, local variables, and the like of the method that created the object, and/or other attribute data related to a class corresponding to a given object. The snapshot permits a copy of all the local variables to be bundled as a file along with the objects for future reference.

The data serializer 112 can serialize the data into a file and output the file to the data repository 110 or other storage device. The data serializer 112 can be part of the computer system 100, or can be part of a different computer system having a processor, memory, network interface, etc. The data serializer 112 serializes the data snapshot generated by the exception handler 108 into an exception bundle. The exception bundle can be generated in a text format, for example, a flat file text-based log. The exception bundle can be stored in the data repository 110 or other database known to those of ordinary skill in the art, and/or transmitted to the error analyzer 116. A developer or other user can recreate the in-memory reference objects to a state at the time of the anomalous event, for example, an exception. The captured exception data can be stored in a flat-file or xml based layout, and the like. Portions of the captured runtime information can include binary or compiled code objects, and the like.

The error analyzer 116 includes a processor 117, a memory 119 having an in-memory interactive object generator 118, and a network interface 119, which can communicate with each other over one or more communications busses, for example, a Peripheral Component Interconnect (PCI) bus. The in-memory interactive object generator 118 converts the serialized data received from the data serializer 112 into an active in-memory representation of those objects that reflect a localized representation of the original environment in which a software component failed. In particular, the in-memory interactive object generator 118 can repopulate the snapshot taken by the exception handler 108 with reconstructed in-memory values and the like by instantiating objects corresponding to the contextual object information extracted from the captured log, trace, or dump data, which can be restored to a state at the time of the exception. The in-memory interactive object generator 118 can output the object classes as well as a generated driver class for testing the deserialized results to the test unit 120, for example, a JUnit sandbox or other debugging tool. The test unit 120 can process the in-memory reference objects, restored to a state at the time of the exception, without the need for the test unit 120 to be attached to a running debugging process.

Figure 2:
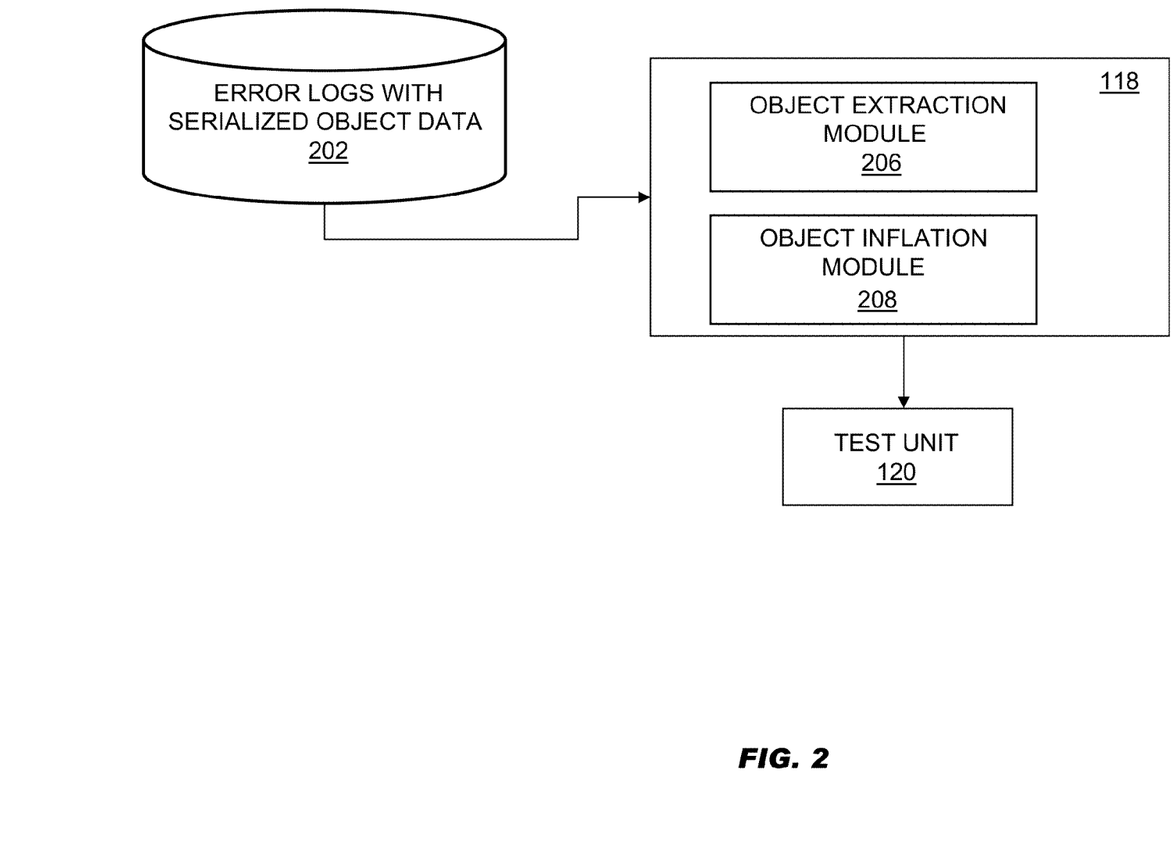
FIG. 2 is a block diagram of an in-memory interactive object generator shown in FIG. 1, in accordance with an embodiment.

FIG. 2 is a block diagram of the in-memory interactive object generator 118 shown in FIG. 1, in accordance with an embodiment. The in-memory interactive object generator 118 can execute entirely on the error analyzer 116, or a different standalone computer platform. Alternatively, some elements of the in-memory interactive object generator 118 can execute on the error analyzer 116 or other computer platform, while other elements execute on a remote computer such as the test unit 120 or the computer system 100. The in-memory interactive object generator 118 can include hardware, software, firmware, or a combination thereof. The in-memory interactive object generator 118 includes an object extraction module 206 and an object inflation module 208.

The object extraction module 206 receives error logs with serialized object data as input, and automatically extracts contextual object data from the error logs. The contextual object data can be extracted from sections of an error log corresponding to an area of program code proximal to a failing software component or components. The error logs can include application log and trace files, operating system log files, memory dumps, and the like, and be provided by a logger 106 and/or event handler 108.

The object inflation module 208 converts the serialized contextual object information of the received error logs into an executable and interactive environment. This can be achieved by the object inflation module 208 generating an in-memory representation of the objects, which can provide a localized representation of the original environment around the failing component, for example, a state of the objects at the time of the thrown exception The deserialized object inflation module 208 can reconstruct memory values and the like from the extracted contextual object information. The reconstructed in-memory values of the captured objects can be used, for example, by a developer or support engineer when stepping through a malfunctioning portion of the software program line-by-line. Since active in-memory interactive objects are generated, these objects can be used locally, for example, in a sandbox environment, or any debugging environment that enables a support engineer, a developer, etc. to see the in-memory representation of the objects around where an anomalous condition such as an error, exception, and the like, and to quickly debug the program code to identify the source of the component failure.

Figure 3:
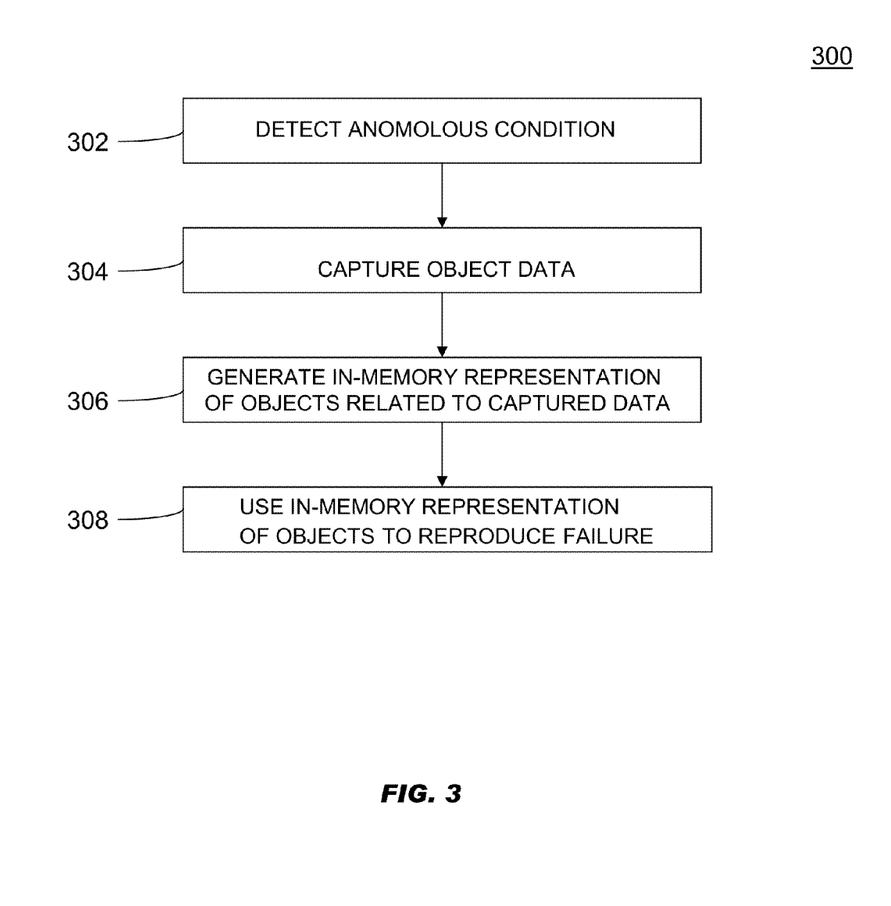
FIG. 3 is a flowchart illustrating a method for generating interactive objects from passive log data, in accordance with an embodiment.

FIG. 3 is a flowchart illustrating a method 300 for generating interactive objects from passive log data, in accordance with an embodiment. In describing the method 300, reference is also made to FIGS. 1 and 2. The method 300 can be governed by instructions that are stored in a memory and executed by a processor of the computer system 100 and/or the error analyzer 116.

At block 302, an anomalous condition such as an exception or related event or error is detected. The anomalous condition can include a throwable exception or error. The anomalous condition can be detected according to tools and/or techniques known to those of ordinary skill in the art.

At block 304, object data can be captured. In an embodiment, the object data includes contextual object information extracted from passive log, trace, or memory dump files proximal to an area of code where the exception occurred, for example, near an area of a failed program component. In an embodiment, a snapshot is taken of one or more active classes determined at the time of the exception occurrence, and stored, for example, in the data repository 110. The snapshot can include a snapshot of objects that are active at a specific point in time during execution. The snapshot can include the current values of member fields of one or more classes, current values of input parameters, local variables, and the like.

At block 306, an in-memory representation of objects related to the captured data can be generated. The objects can be instantiated in memory from the extracted contextual object data. The active in-memory representation of the objects can be created to reflect a localized representation of the original environment in which a software component failed. This can be achieved by the in-memory interactive object generator 118 repopulating the snapshot of the active classes with reconstructed in-memory values and the like related to the captured objects. The contextual object information of the captured log, trace, or dump data can be recreated as in-memory objects, for example, recreated to a state at the time of the exception.

Figure 4:
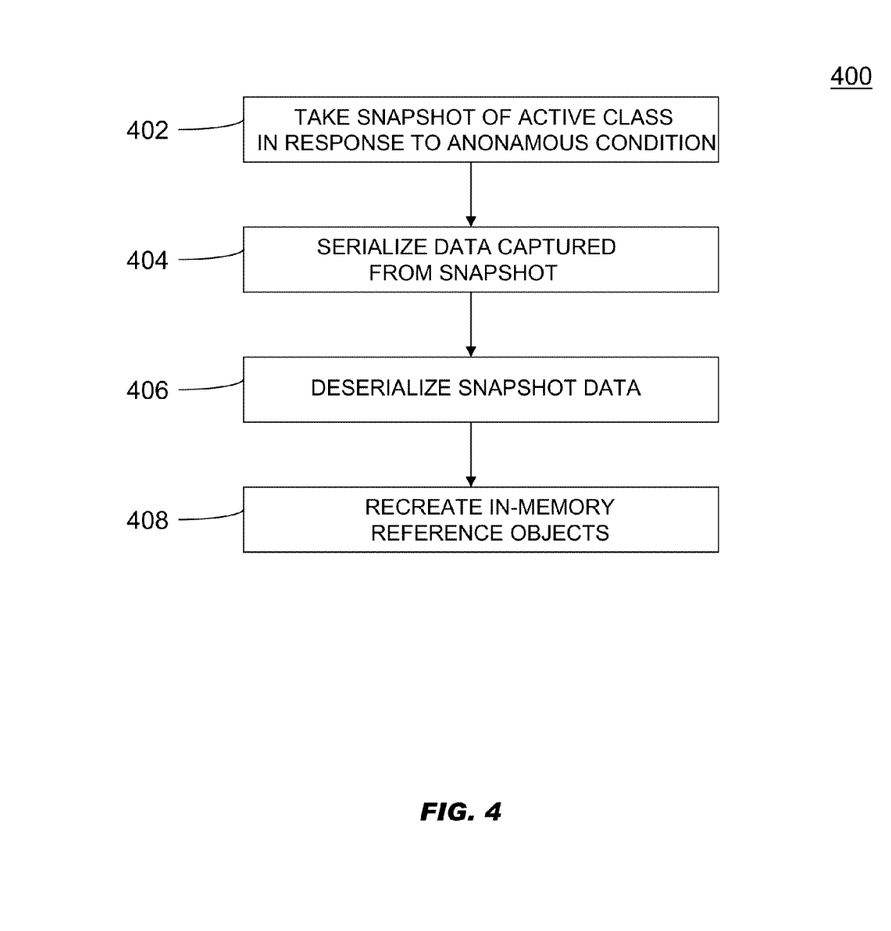
FIG. 4 is a flowchart illustrating a method for debugging a software program, in accordance with an embodiment.

At block 308, the in-memory representation of the objects can be used to reproduce component failure resulting in the anomalous condition. In an embodiment, the recreated objects are used locally to reproduce a failure, error, exception, and the like, for example, a Junit test environment. In another embodiment, the recreated objects are output to a debug tool, for example, for black-box or white-box debugging. In another embodiment, the recreated objects are used by the error analyzer 116 to allow a user, for example, a support engineer, to see the in-memory representation of the objects about where the error or exception occurred in the error FIG. 4 is a flowchart illustrating a method 400 for debugging a software program, in accordance with an embodiment. In describing the method 400, reference is also made to FIGS. 1 and 2. The method 400 can be governed by instructions that are stored in a memory and executed by a processor of the computer system 100 and/or the error analyzer 116.

At block 402, a snapshot can be taken of an active class in response to an anomalous condition, for example, an exception thrown during the execution of a program. The snapshot can include current values of class member fields, method input parameters, local member fields, or other object-related data used to recreate a localized environment around the failing component.

At block 404, data captured from the snapshot can be serialized into an exception bundle. The exception bundle can be generated as a flat file or related format suitable for storing in a data repository and/or transmitting to a destination computer, for example, to a support engineer for debugging the program code under test.

At block 406, the snapshot data can be deserialized, for example, when the serialized snapshot data is received by the in-memory interactive object generator 118.

At block 408, the in-memory reference objects can be recreated, for example, to a state at the time of the exception. Accordingly, the original error condition can be reproduced in a localized environment from the in-memory reference objects.

Figure 5:
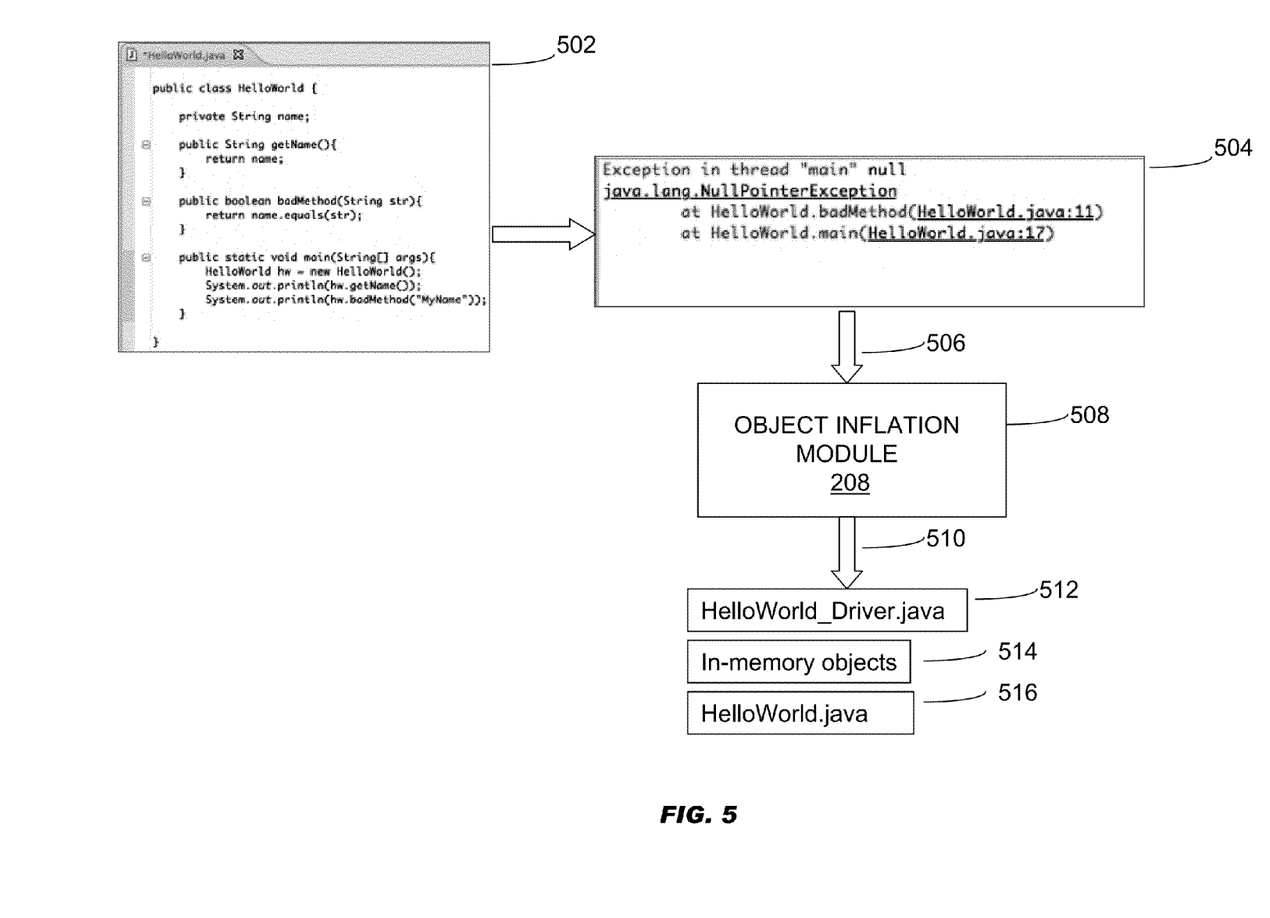
FIG. 5 is a schematic block diagram illustrating a method for converting logged data into an executable, interactive environment, in accordance with an embodiment.

FIG. 5 is a schematic block diagram illustrating a method 500 for converting logged data into an executable, interactive environment, in accordance with an embodiment. In describing the method 400, reference is also made to FIGS. 1 and 2.

A well-known Java program 502 entitled "Helloworld.java" is provided which, when compiled and run, prints the text string "HelloWorld" on a computer display.

An exception 504 is generated when the program 502 crashes. In this illustration, the program 502 crashed on line 11 in the method called "badmethod" in the "Helloworld" class (line 15 of the file Account.java). This method was called from line 1 of the file "Helloworld.java," from the main method.

An error log corresponding to the exception 504 is output to the object inflation module 208. Object data of the program 504 is serialized for storing and is also output to the object inflation module 208. The object inflation module 208 can deserialize the helloworld class, and output a generated driver class 512, for example, to a test tool described herein. In addition, the object inflation module 208 can deserialize, i.e., inflate, the serialized object data of the classes, thereby converting the serialized object data into one or more in-memory objects. In this manner, the serialized object data can be restored to a state at the time of the exception. A software developer can therefore avoid analyzing the error log corresponding to the exception 504 and provide the output directly to a debugger.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method for generating active in-memory interactive object from stored program failure data, comprising:
   detecting an anomalous condition related to a program failure;
   capturing data regarding the anomalous condition;
   storing the captured data;
   converting the stored data into at least one active in-memory interactive object; and
   reproducing a runtime environment about a region of code related to the program failure from the at least one active in-memory interactive object, wherein reproducing the runtime environment includes reflecting a localized representation of an original environment of a program related to the program failure, the localized representation being proximal to the region of program code of the program failure;
   generating a snapshot of an active class related to the captured data, wherein the snapshot includes at least one of values of member fields of the active class, values of input parameters of at least one method corresponding to the active class, and local member fields;
   auto-serializing object data of the active class into a file in response to the anomalous condition;
   deserializing the file;
   reconstructing in-memory values of the object data of the active class;
   generating a log file in response to detecting the anomalous condition, wherein the log file includes at least one of a character-based log, a trace file, an operating system log file, and a dump file;
   automatically extracting contextual object data from the log file proximal to an area of the program failure;
   instantiating the at least one active in-memory interactive object from the extracted contextual object data; and
   providing the at least one active in-memory interactive object to a test tool for debugging.

2. The computer-implemented method of claim 1, wherein deserializing the file includes restoring the object data to a state at the time of the anomalous condition.

3. The computer-implemented method of claim 1, further comprising reproducing the runtime environment in response to receiving a driver class, referenced object classes, and the at least one active in-memory interactive object.

4. The computer-implemented method of claim 1, wherein the test tool includes a unit-test sandbox.

5. A computer-implemented method of debugging a software program, comprising:
   generating a snapshot of an active class in response to an abnormal condition generated from a software component failure, wherein the snapshot includes at least one of values of member fields of the active class, values of input parameters of at least one method corresponding to the active class, and local member fields;
   auto-serializing object data of the active class into a file in response to the abnormal condition;
   converting the serialized object data into at least one active in-memory interactive object corresponding to a localized representation of an original environment at which the abnormal condition occurred; and
   reproducing a runtime environment about a region of program code related to the software component failure from the at least one active in-memory interactive object, wherein reproducing the runtime environment related to the software component failure includes reflecting a localized representation of an original environment of a program related to the software component failure, the localized representation being proximal to a region of program code of the software component failure;
   deserializing the file;
   reconstructing in-memory values of the object data of the active class;
   generating a log in response to the software component failure, wherein the log includes at least one of a character-based log file, a trace file, an operating system log file, and a dump file;
   automatically extracting contextual object data of the object data from the log, the contextual objects extracted from a section of the log proximal to the region of program code of the software component failure;
   instantiating the at least one active in-memory interactive object from the extracted contextual object data; and
   providing the at least one active in-memory interactive object to a test tool for debugging.

6. The computer-implemented method of claim 5, further comprising reproducing the environment related to the failure in response to receiving a driver class, one or more referenced object classes, and the at least one active in-memory representation of the interactive object.

7. The computer-implemented method of claim 5, wherein the test tool includes a unit-test sandbox.

8. A computer program product for generating active in-memory interactive object from stored program failure data, the computer program product comprising:
   a non-transitory computer readable storage medium having computer readable program code embodied therewith, the computer readable program code comprising;
   computer readable program code configured to detect an anomalous condition related to a program failure;
   computer readable program code configured to capture data regarding the anomalous condition;
   computer readable program code configured to store the captured data;
   computer readable program code configured to convert the stored data into at least one active in-memory interactive object; and computer readable program code configured to reproduce a runtime environment about a region of code related to the program failure from the at least one in-memory object, wherein reproducing the runtime environment includes reflecting a localized representation of an original environment of a program related to the program failure, the localized representation being proximal to the region of program code of the program failure;

computer readable program code configured to generate a snapshot of an active class related to the captured data, wherein the snapshot includes at least one of values of member fields of the active class, values of input parameters of at least one method corresponding to the active class, and local member fields;

computer readable program code configured to auto-serialize object data of the active class into a file in response to the anomalous condition;

computer readable program code configured to deserialize the file;

computer readable program code configured to reconstruct in-memory values of the object data of the active class;

computer readable program code configured to generate a log file in response to detecting the anomalous condition, wherein the log file includes at least one of a character-based log, a trace file, an operating system log file, and a dump file;

computer readable program code configured to automatically extract contextual object data from the log file proximal to an area of the program failure;

computer readable program code configured to instantiate the at least one active in-memory interactive object from the extracted contextual object data; and computer readable program code configured to provide the at least one active in-memory interactive object to a test tool for debugging.

* * * * *